Patented Dec. 10, 1940

2,224,603

UNITED STATES PATENT OFFICE 2,224,603

PROCESS FOR THE SYNTHESIS OF DRYING OILS FROM PETROLEUM HYDROCARBONS

Herman B. Kipper, Accord, Mass.

No Drawing. Application August 17, 1939. Serial No. 290,624

5 Claims. (Cl. 134—56)

Applicant has patents recently granted and other patents pending covering the syntheses of unsaturated liquid hydrocarbons and chlorinated unsaturated liquid hydrocarbons from petroleum oils. Both oxygen at superatmospheric temperatures and pressures with the aid of catalysts and nitric acid were used to produce unsaturation, or dehydrogenation, and oxidation.

Applicant has now found that unsaturation, or dehydrogenation, and oxidation of petroleum oils is far more simply and effectively produced when using nitric acid as the oxidant for selective oxidation in the presence of suitable metallic oxide catalysts.

The class of metallic oxides that are suitable for this purpose is embraced more especially by the group of metals generally known to form more than one oxide, as for instance: copper, iron, silver, tin, bismuth, cobalt, chromium, manganese, cadmium, lead, molybdenum, mercury, nickel and tungsten, applicant has not worked with gold and platinum, because of their costs in comparison with the other metals whose oxides have proven fully satisfactory, nor with arsenic because of its poisonous nature. For similar reasons he has not worked with the so-called oxides of the rare earths or elements.

As examples of applicant's processing five hundred grams of a so-called No. 4 heavy fuel oil having a specific gravity of approximately 0.9 were dehydrogenated or oxidized with one hundred twenty-five grams of nitric acid, specific gravity 1.42. Thirty grams of powdered copper oxide were added to the oil, which was heated to one hundred and twenty degrees centrigrade. Heating was then discontinued and the nitric acid slowly added but at sufficient speed to maintain the temperature at the above noted degree. Strong stirring of the oil mass, with suspended copper oxides, was maintained while the nitric acid was added. Considerable frothing of the oil occurs. The treated oil was filtered off from the copper oxide and is even then suitable, except for a reddish color, as a drying or oxidizing oil. Suitable washing of the oils with water, however, was practiced. A good deal of a gummy, semi-resinous-like mass is obtained when using iron instead of copper oxide. Manganese dioxide also gives a viscous mass but lighter as a by-product. Ferric hydroxide gives a good oil with the viscous by-product practically eliminated.

Runs similar to the above were carried out with the higher oxides of all the metals mentioned. Also ferric compounds, as the iron salts decomposed by nitric acid, as the carbonate, may also be used in place of the oxides.

A silver-copper oxide was also made by dissolving the nitrates of these metals in equimolecular proportions and precipitating with sodium hydroxide, filtering and suitably washing. Five hundred grams of a heavy fuel oil were also dehydrogenated and oxidized with seventy-five grams of nitric acid 1.5 specific gravity mixed with an equal weight of phosphoric acid. When using the above acid combination, and by surrounding the reaction vessel with ice, the temperature of the oil was maintained below twenty degrees centigrade. The phosphoric acid takes up the water given off during the reaction, so that the nitric acid does not become unduly diluted and the reaction is continued even at the above low temperature. An iron-copper oxide catalyst was also made up similarly to the silver-copper oxide catalyst. Although possibly not quite as good as the latter, it appeared nearly so and these two combination catalysts represented the best found.

At one hundred and twenty degrees centigrade fuming nitric acid of 1.5 specific gravity was used in a considerable number of experiments. This acid, as well as the straight oxides of nitrogen, are even more suitable than the common 1.42 specific gravity nitric acid. Very little frothing is produced while carrying out the oxidation. Applicant generated the oxides of nitrogen by decomposing lead nitrate. Fuming nitric acid must be used in conjunction with phosphoric acid at the higher temperatures. At twenty to thirty degrees, applicant used this more highly concentrated acid fully satisfactorily for oxidation work in conjunction with the metallic oxide catalysts. The strong acid alone produces a considerable percentage of a gummy mass and an unsatisfactory drying oil. At the higher temperatures a complete break-down of the oil occurs, with formation of hard, porous resinified masses.

Oils generally had from a light to a dark red color. Applicant found that this discoloration may be removed by washing with acetic acid. Also mercurous and cuprous chlorides were found valuable for prevention of this red discoloration in the low temperature oxidation experiments, especially when using phosphoric acid.

Chlorination and selective oxidation of the oils were simultaneously established by simply passing chlorine or hydrochloric acid gas into the oils during oxidation. At one hundred twenty degrees the hydrochloric acid gas given off by reaction is largely decomposed to free chlorine, which then reacts with the hot oil. Naturally, the nitric acid must be used in sufficient calculated amount to establish both the dehydrogenation desired and hydrochloric acid gas decomposition.

Applicant also passed chlorine into a fuel or gas oil to establish chlorination, from one to twenty percent of chlorine on weight of oil were used for this purpose. These chlorinated oils were then selectively oxidized or dehydrogenated in the same manner as that used for the straight petroleum oils. In this work from light to heaviest gas and fuel oils, securable on the market, were used for both chlorination and oxidation.

The speed of drying of the oils fabricated when applied in atmospherically exposed films depends at least partially on the amount of dehydrogenation or selective oxidation to which the oils were subjected. From twenty-five to one hundred and fifty grams of both 1.42 and 1.5 specific gravity nitric acids were actually tried out in oxidizing five hundred grams of fuel or gas oils at from ten to one hundred seventy-five degrees centigrade, and with and without the use of phosphoric acid. At the higher temperatures the phosphoric-nitric acid mixture acts fairly satisfactorily without the use of the metallic oxides or the metallic phosphates formed therefrom.

All of the oils fabricated dried to excellent lustrous films, but the speeds of film formation showed wide divergence. The viscosity of the fabricated oil apparently has something to do with the speed of atmospheric film formation. Applicant tried not only the oxides in various combinations, etc. but the chlorides of various metals, as copper, aluminum, chromium, silver, etc. in the conjunction with these, but without what one might term perfect resuls. Resins, as colophony, damar and copal resins, phthalic acid, etc. were also added to the petroleum oils to establish their condensations with the oils as the latter become more fully unsaturated, through the action of phosphoric acid and the catalysts acting as condensation agents. More satisfactory drying speeds were thereby obtained. It was also found that by adding a small percentage of what is generally termed an emulsifying agent to the oils, whereby their viscosity was materially increased, and then conducting the dehydrogenation as has already been described, that speeds of drying in atmospherically exposed films were enhanced.

As examples of these experiments to five hundred grams of a heavy fuel oil which had been oxidized with seventy-five grams of 1.5 specific gravity nitric acid in the presence of catalysts as already described, twenty-five grams of dibutylphthalate and twenty-five grams of resin were added. About thirty grams of finely divided copper oxide and ferric hydroxide in about equal weights were used as the catalyst. Under thorough stirring, thirty-five grams of 1.5 specific gravity nitric acid were then run into the oil at under twenty degrees centigrade. About one hour for the reaction was required. The oil was filtered off from the catalyst and used directly as a drying oil. In place of dibutylphthalate, butylcrotonate, ethylcrotonate and resins; linseed, tung and soya-bean oils were similarly employed. The metallic oxides tend to form soaps with these vegetable oils so that they were not employed. Nitric acid mixed with phosphoric acid was used in these oxidations at from ten to fifty degrees and satisfactorily fairly repidly drying oils secured. Phosphoric and nitric acids were used in about equal weights, although in a number of experiments the relative percentages were greatly varied.

The final step undertaken by applicant was to condense the dehydrogenated, unsaturated and oxided petroleum oils produced by the oxidation methods outlined with resins, as colophony, damar and copal resins, in the presence of solid acid or hydrogen metal phosphates, for instance solid copper hydrogen phosphate. The latter was prepared from cupric oxide and orthophosphoric acid by mixing in proportions to give the acid or hydrogen phosphate and then adding infusorial earth to give a pasty mass. The latter was heated to about five hundred degrees centigrade when small, hard, ball-like masses were obtained. Similar catalysts were made from iron and zinc oxides. Copper, however, appeared to be the superior catalyst. The catalysts were pulverized for my condensation work. The latter consisted simply in heating the oxidized oil under strong stirring and with admixture of the resins. For instance, in one run to five hundred grams of a heavy petroleum oil of 0.9 specific gravity which had been oxidized with seventy-five grams of a 1.5 specific gravity nitric acid in the presence of cupric oxide and ferric hydroxide as the catalytic combination, was added fifty grams of colophony resin, and the mass was heated for an hour at one hundred and twenty degrees under strong stirring with about thirty grams of solid copper hydrogen phosphate, finely powdered. The oil produced was filtered off from the catalytic material. It represented an excellent drying oil, showing a speed of drying comparable with that of tung oil when exposed to the atmosphere in pigmented films.

Various temperatures were used for these condensations, from fifty to one hundred and fifty degrees centigrade. Of course, even higher temperatures might be used and the speed of condensation thereby increased. At the lower temperatures, the speed of condensation was comparatively slow but darkening of the oil is almost entirely prevented.

Applicant has also used oils in which dehydrogenation or unsaturation was produced by oxygen at superatmospheric pressures and temperatures with the aid of specific catalysts on which applicant now has patents pending. The results obtained with the latter oils were practically the same as the results secured from the oxidations with nitric acid. If the unsaturation of the petroleum oil is insufficient, following the condensation a further slight oxidation may be further carried out, as for instance with five percent nitric acid; in this manner oils of assured very high speed drying qualities are obtainable. All of this work was conducted in open vessels but in an atmosphere of nitrogen, that is, an inert gas. In commercial work, naturally closed vessels would be employed.

If applicant described all details, it would fill a great many pages. He believes, however, that he has described his processing in sufficient detail so that it should be readily duplicated by anyone skilled in the art. To close, applicant may state that he has tried out the oils fabricated as vehicles with a large number of pigments, as ferric oxide, titanium oxide, red lead, Prussian blue, lithopone, chrome greens and yellows, etc. and found the oils fabricated fully satisfactory when used in atmospherically exposed films. For test purposes, applicant has mixed these oils with so-called paint thinners and other drying oils in various paints made up by him.

In the oxidation and chlorination experimentation, metallic chlorides are formed, as to be expected. Applicant, however, found it more advantageous to start with the oxides. Renewal of catalysts would be made with the latter and some of the metal chlorides would have to be gradually discarded. The latter in too high concentration in the catalysts cause too much "gumming" of the oils. Nitric acid mixed with phosphoric acid worked satisfactorily in this chlorination work as far as the quality of the oils themselves were concerned, but the hydrochloric acid gas formed is then given off practically in full.

In the final condensations with resins, solid phosphoric acid was used as well as metal phosphate. The hydrogen metal phosphates were found the more efficient, however. Minor points of this nature may not have been fully included in these specifications. The better methods worked out are those described, and the less efficient ones should naturally be considered as included in these.

I claim:

1. In a process for the dehydrogenation and oxidation of petroleum oils to produce so-called drying oils, the step of selectively oxidizing the said oils under agitation with nitric acid in the presence of an oxide of a metallic element, as a catalytic material, from the group of metallic elements with commonly known higher and lower oxides and consisting of copper, iron, silver, tin, bismuth, cobalt, chromium, manganese, cadmium, lead, molybdenum, mercury, nickel and tungsten, and the step of condensing the said oxidized oils with resins in the presence of so-called solid phosphoric acid.

2. In a process for the dehydrogenation and oxidation of petroleum oils to produce so-called drying oils, the step of selectively oxidizing the said oils, mixed with resins, under agitation with nitric acid in the presence of an oxide of a metallic element, as a catalytic material, from the group of metallic elements with commonly known higher and lower oxides as enumerated in claim 1, and the step of condensing the said oxidized oils with resins in the presence of solid acid metal phosphates.

3. In a process for the dehydrogenation and oxidation of petroleum oils to produce so-called drying oils, the step of selectively oxidizing the said oils, mixed with resins, under agitation with nitric acid mixed with phosphoric acid in the presence of an oxide of a metallic element, as a catalytic material, from the group of metallic elements with commonly known higher and lower oxides as enumerated in claim 1, and the step of condensing the said oxidized oils with resins in the presence of solid hydrogen-copper phosphate.

4. In a process for the dehydrogenation and oxidation of petroleum oils to produce so-called drying oils, the step of selectively oxidizing the said oils at ten to one hundred and seventy-five degrees centigrade under agitation with nitric acid, in the presence of copper oxide and ferric hydroxide, as catalytic materials, and the step of condensing the said oxidized oils with colophony resin in the presence of solid hydrogen-copper phosphate.

5. In a process for the dehydrogenation, oxidation, and chlorination of petroleum oils to produce so-called drying oils, the step of selectively oxidizing and chlorinating the said oils under agitation with nitric acid and chlorine in the presence of an oxide of a metallic element, as a catalytic material, from the group of metallic elements with commonly known higher and lower oxides as enumerated in claim 1, and the step of condensing the said oxidized oils with resins in the presence of solid copper-hydrogen phosphate.

HERMAN B. KIPPER.